United States Patent Office 3,702,121
Patented Nov. 7, 1972

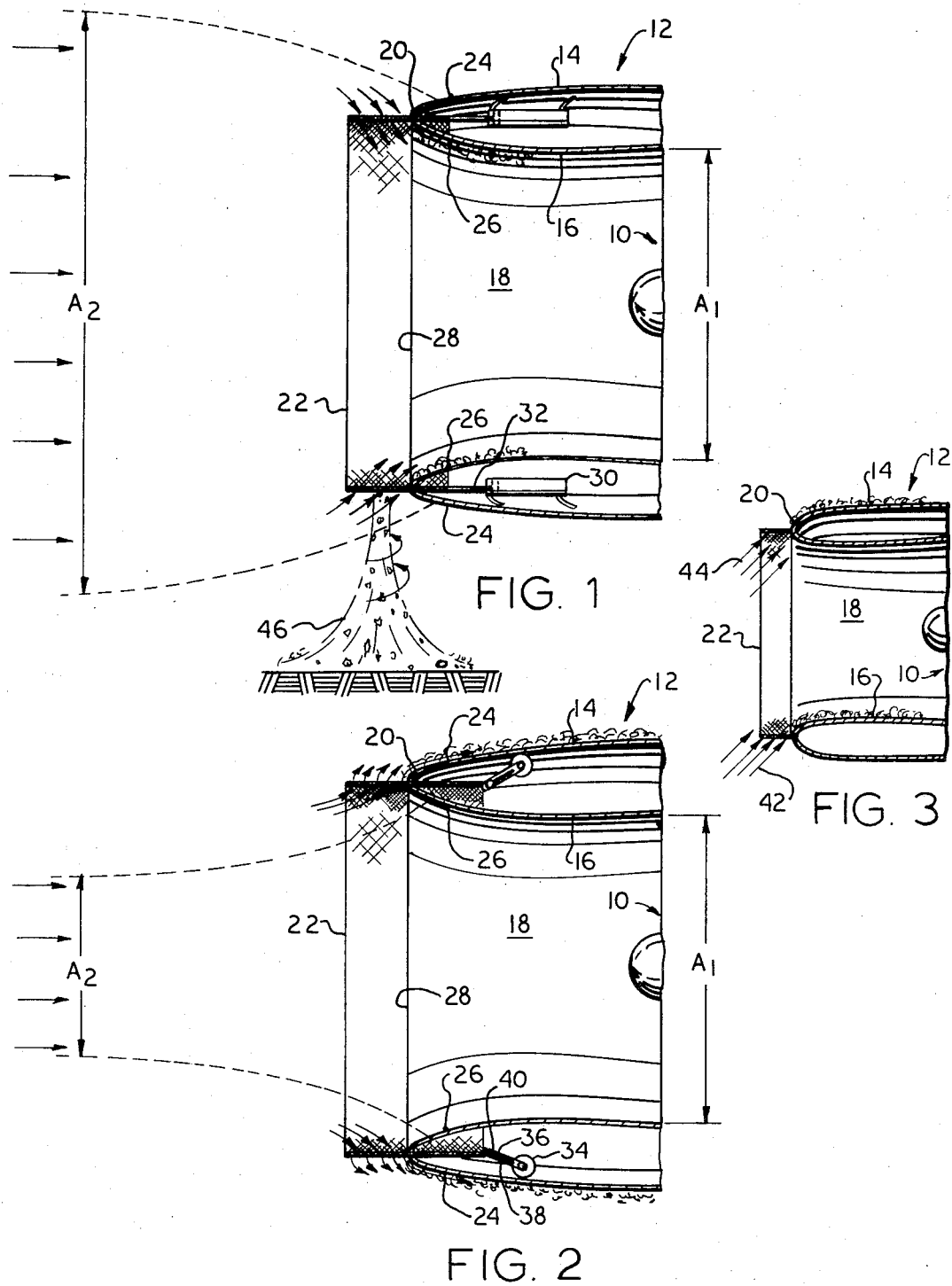

3,702,121
INLET FLOW CONTROL SYSTEM FOR
JET ENGINE
Victor Millman, San Diego, Calif., assignor to Rohr
Industries, Inc., Chula Vista, Calif.
Filed Jan. 20, 1971, Ser. No. 107,887
Int. Cl. F02b 27/00
U.S. Cl. 137—15.1
11 Claims

ABSTRACT OF THE DISCLOSURE

System includes a housing which comprises all or part on an inlet throat for directing flow of intake air from ambient atmosphere to compressor of jet engine. Housing has thin, slightly rounded inlet lip. At standstill or low ground roll speeds, compressor demand pulls air in laterally across inlet lip and this air breaks away from housing inner wall at small curvature of lip, disturbing total flow and often causing compressor stall and engine flameout. Perforate fence, which is preferably wire screen, extends along periphery of inlet lip in fore and aft attitude, and laterally flowing air passes through it. Fence produces fine turbulence and high velocity and energy which energizes the boundary layer within the throat and improves airflow to compressor. At high cruise speeds, the excess air adjacent to the stream tube flows laterally outward across the inlet lip and the same perforate fence strains this airflow and energizes the boundary layer on the outer surface of the housing to delay the drag rise of the inlet lip. In a strong cross wind, the same fence acts in substantially the same way to improve the recovery of the inlet. The fence may be fixedly mounted in active position or may be retractable within or flush upon the forward portion of the housing.

BACKGROUND OF THE INVENTION

This invention lies in the field of gas turbine or jet engines of the type having a high bypass ratio and having axial flow compressors located forward of the turbines. Such an engine may be mounted within a nacelle or the fuselage of an airplane, and the housing constituting the forward portion may be a complete generally annular cowl or a partial cowl with a wall of the fuselage cooperating to define an air inlet throat. In either form, the housing is formed with an inlet lip in a plane generally normal to the line of flight, the lip having a radius of curvature suited to the performance characteristics of the airplane.

In airplanes having high cruise speeds, and particularly with very large diameter cowls, the design requirements call for inlet lips having a relatively small radius of curvature, commonly referred to as "sharp" inlet lips. With such a sharp lip, the airflow laterally either inward or outward across the lip breaks away from the succeeding surface and produces large scale turbulence with resulting high drag.

In the case of engine run-up at standstill or low forward speeds, the compressor demands more air than will readily flow in a stream tube having an area equal to the area of the compressor. Consequently a large proportion of the air is drawn in from the surrounding volume, and the airflow adjacent to the inlet lip has a high lateral component with respect to the engine axis. Therefore it breaks away from the wall of the inlet throat and produces large scale turbulence and interferes with axial flow to such an extent that it frequently causes compressor stall and engine flameout. Many installations are provided with "blow-in" doors aft of the inlet lip to allow large lateral inflows of air close to the compressor. These devices work reasonably well but incorporate considerable mechanical and structural complication.

When an airplane is traveling at high cruise speed, the compressor accepts less air than that contained in a stream tube having an area equal to the area of the compressor. Thus, a relatively small stream tube expands rearwardly to meet the inlet lip at the high speed stagnation point, and the surrounding airstream flows laterally outward to pass over the exterior of the cowl or housing. This airstream produces the same type of breakaway as previously mentioned with a resulting undesirable drag rise. So far as known, there have been no devices proposed which help noticeably with this problem.

A strong cross wind presents a combined problem, because it produces a breakaway within the housing at the approach side and a breakaway from the outer surface of the housing at the departure side. There are no previously known devices which solve this problem.

SUMMARY OF THE INVENTION

The present invention presents a simple and reliable system which overcomes all of the difficulties discussed above with a minimum of structural and mechanical changes or additions, and it is particularly suitable for modifications of existing cowl structures with only minor design changes.

Generally stated, the system comprises an addition to a jet engine installation in which the turbine and compressor are enclosed within a nacelle having a cowl defining an inlet throat, or within a fuselage having one or more forward housings cooperating with a fuselage wall to define an inlet throat. In either case, the housing has a relatively "sharp" but somewhat rounded inlet lip. A permeable or perforate fence extends along the inlet lip and projects forward a suitable predetermined distance. The fence may take various forms including a multiplicity of individual members in closely spaced relation providing a multiplicity of discrete apertures or passages for lateral flow across the inlet lip toward or away from the inlet throat. The presently preferred form of fence, however, is a wire mesh screen of suitable strength and rigidity because it is very easy to construct and mount and it performs the desired functions in a highly satisfactory manner. In the more usual case of the generally annular nacelle and cowl, the fence is a piece of screen in the general form of a cylinder extending a slight distance forward from the inlet lip. It may converge or diverge forward to some degree depending on design considerations.

As mentioned above, at standstill and low forward speeds air is drawn laterally into the inlet throat across the inlet lip. As this air passes through the multiplicity of openings in the fence it is broken up into a multiplicity of very small streams having very fine turbulence and high velocity and energy. These streams scrub and energize the boundary layer on the wall of the inlet throat, thus improving and increasing the air flow to the compressor. This increase in the quantity and smoothness of the airflow prevents compressor stall and flameout.

The situation at high cruise speeds is substantially the reverse because excess air now flows outward across the inlet lip and through the fence. It is broken up in the same way to energize the boundary layer on the outer surface of the housing and thus delay the drag rise of the inlet lip.

A strong cross wind produces inflow across the inlet lip at the wind approach side and outflow across the inlet lip at the departure side. In this case various portions of the fence reduce the drag rise and assist the recovery of the inlet, thus reducing engine stall characteristics.

BRIEF DESCRIPTION OF THE DRAWINGS

Various other advantages and features of novelty will become apparent as the description proceeds in conjunction with the accompanying drawing, in which:

FIG. 1 is a schematic section of the forward portion of an inlet housing showing the system of the invention at the low speed condition;

FIG. 2 is a view similar to FIG. 1 illustrating the high speed condition; and

FIG. 3 is a view similar to FIG. 1 illustrating the crosswind condition.

DESCRIPTION OF PREFERRED EMBODIMENTS

The assembly shown schematically in FIG. 1 includes a compressor 10 driven by a turbine, not shown, and enclosed in a housing 12. The housing includes an outer wall 14 defining the contour of the forward portion of a nacelle which encloses the engine assembly, and an inner wall 16 which defines the air inlet throat 18 for the compressor. Walls 14 and 16 approach each other at their forward ends to form an inlet lip 20 which is rounded but has a radius of curvature which is relatively "sharp."

When the engine is run up to a rather high rotational speed and power at standstill or low forward speeds such as takeoff ground roll, the compressor will demand more air than will readily flow in a cylindrical stream tube of the same area as the compressor. FIG. 1 shows schematically a stream tube having an area $A_2$ representative of the air required by the compressor with area $A_1$. The central portion of the stream tube will flow substantially axially into the inlet throat but the outer portions will be drawn radially into the circle and those portions which pass adjacent to inlet lip 20 will have a rather large radial component. Flow will also be from a rearwardly direction flowing forward and around the sharply curved inlet lip. In the absence of the system of this invention, such portions will pass the inlet lip at such angle and velocity that they cannot follow the abrupt change of curvature and therefore they will break away from inner wall 16 and produce large scale turbulence throughout a large proportion of the inlet throat, thus hindering and breaking up the axial airflow creating a pressure distortion and reducing the total flow to the compressor with the net effect that the compressor may very readily stall and cause engine flameout.

To overcome this defect, a permeable or perforate fence 22 is provided, which may comprise a multiplicity of individual members in closely spaced relation producing a multiplicity of flow passages. However, in the preferred form the fence is made from a length of wire mesh screen formed into a cylinder or other shape conforming to the front elevation of inlet lip 20. The fence is mounted as shown to project forward a distance determined by design considerations. When the outermost portions of the stream tube flow through the passages in the fence, they are broken up into a multiplicity of individual air streams, each with a very fine turbulence produced by contact with the elements of the fence structure and with high velocity and energy. These air streams scrub wall 16 and energize the boundary layer, improving the flow along the wall and greatly reducing interference with the axial flow in the central portion of the throat. The result is greater and smoother flow to the compressor which practically eliminates the chance of compressor stall.

It will be observed that fence 22 meets the inlet lip along a line of junction extending around the periphery of the lip. The line of junction is located inward of the outermost stagnation point 24 so that all of the fence area will act on inflowing air. It is also located outward of the innermost stagnation point 26 so that all of the fence area will act on outflowing air as will be discussed below.

In some installations, as indicated in FIG. 3, the fence may be fixedly mounted to project forward at all times, but it is presently preferred to make the device retractable for various reasons including protection when the engine is not being operated. To this end, the inlet lip is provided with a peripheral slot 28 which coincides with the line of junction, and fence 22 is axially slidable through the slot. In retracted position it may be entirely within the housing 12 or it may project slightly. The slot may be provided with a seal to prevent air flow through the housing. Protraction and retraction is accomplished with a plurality of fluid cylinders 30 having piston rods 32 attached to the rear margin of the fence.

FIG. 2 illustrates the condition at high speed cruise. At this time a stream tube having an area $A_2$ considerably less than area $A_1$ of the compressor will supply all of the air demanded by the compressor. Consequently the stream tube diverges to meet the inlet lip at an inner stagnation point and the excess air adjacent to the stream tube flows outward across the inlet lip. This air would be unable to negotiate the abrupt curvature and would break away from outer wall 14 and produce large scale turbulence and substantial drag rise of the inlet lip. The presence of fence 22 prevents this breakaway and the finely divided air streams passing through the fence energize the boundary layer on outer wall 14 and delay the drag rise in the same way as in FIG. 1.

The fence of FIG. 2 is also shown as being retractable. In this case, fluid or electric rotary actuators 34 are provided with levers arms 36 having elongate slots 38 engaged by pins 40 on the aft margin of the fence. Rotation of arms 36 causes sliding engagement of pins 40 with slots 38 to protract and retract the fence.

FIG. 3 illustrates the condition which prevails when a strong cross wind is encountered. In this case the portion of the relative airstream indicated by arrows 42 is intercepted and treated by fence 22 in the same manner as discussed with respect to FIG. 1 to improve the recovery of the inlet lip. The portion of the relative airstream indicated by arrows 44 is intercepted and treated by fence 22 in the same manner as discussed with respect to FIG. 2 to delay the drag rise of the inlet lip.

While the fence has been described as generally cylindrical it has been determined that it may converge or diverge forwardly to some degree to favor operation at higher or lower speeds. The fence may also be re-curved over the inlet lip and made in sections pivotally mounted to swing to extended operative positions and to retract to positions overlying and flush with the housing.

The fence has added utility in serving as a debris guard during ground operation of the engine. It is a common occurrence for passing air currents to set up small but high energy twisters or whirlwinds on the ground directly beneath the entrance to the inlet throat. The high suction at the inlet often causes these twisters to rise to the inlet, as indicated at 46, FIG. 1, and carry with them debris of all kinds including rocks, nuts, bolts, etc., which cause severe damage to the compressor blades. The fence intercepts this debris and prevents ingestion by the compressor. While screens have been used for this purpose in the past, they have been located in the inlet throat extending across it in a plane normal to the engine axis and retractable against the inner walls. While they barred debris, they also reduced air inflow and thus were forced to be retractable for flight. Since the debris remained on the screens because of the engine suction, it then flowed directly into the compressor, merely delaying the damage until the craft was airborne.

On the contrary, fence 22 retains the debris on its outer side and does not interfere with intake airflow at any time. When the airplane reaches the higher speeds, airflow through the fence is reversed as shown in FIG. 2, and all of the debris is blown away.

It will be apparent that the system disclosed herein provides a highly effective solution to inlet throat airflow problems with a minimum amount of equipment which is simple, durable and reliable.

Having thus described the invention, what is claimed as new and useful and is desired to be secured by U.S. Letters Patent is:

1. An inlet flow control system for a jet engine comprising: a housing forming at least a portion of an inlet throat for directing the flow of air from ambient atmosphere to the compressor of the engine; the forward portion of the housing having a fixed thin inlet lip, and a unitary flow modulating means extending along the whole periphery of the inlet lip and forward of the plane of the inlet lip; the modulating means being constructed to serve as a permeable fence to intercept and strain air flowing laterally through it across the leading edge of the inlet lip and produce fine turbulence to energize the boundary layer and improve airflow along the surfaces of the forward portion of the housing.

2. A system as claimed in claim 1; the modulating means being adjustable to vary the extent of the turbulence created by the interception of the airflow.

3. A system as claimed in claim 1; the modulating means being extendable and retractible between a position producing maximum interception of the air flow and a position producing substantially no effect on the airflow.

4. A system as claimed in claim 1; the housing having an elongate slot extending along the periphery of its inlet lip; the modulating means in retracted position lying substantially entirely within the housing; and power means to extend the modulating means axially forward through the slot to active position.

5. A system as claimed in claim 1; the modulating means comprising a thin perforate fence structure having a line of juncture with the inlet lips located between the high speed and low speed stagnation points.

6. A system as claimed in claim 1; the housing comprising a complete cowl of substantially annular shape; and the modulating means comprising a thin perforate fence structure of substantially cylindrical shape.

7. A system as claimed in claim 1; the modulating means comprising a substantially integral thin fence structure with a multiplicity of small air flow apertures therethrough to divide the total airflow into a multiplicity of very fine streams of high velocity and energy.

8. An inlet flow control system for a jet engine comprising: a housing forming at least a portion of an inlet throat for directing the flow of air from ambient atmosphere to the compressor of the engine; the forward portion of the housing having a thin inlet lip; and flow modulating means extending along the periphery of the inlet lip and forward of the plane of the inlet lip; the modulating means being constructed to serve as a permeable fence to intercept air flowing through it across the leading edge of the inlet lip and produce fine turbulence to energize the boundary layer and improve airflow along the surfaces of the forward portion of the housing, the modulating means comprising a substantially integral thin fence structure with a multiplicity of small air flow apertures therethrough to divide the total airflow into a multiplicity of very fine streams of high velocity and energy, the fence structure being formed of wire mesh screen.

9. A system as claimed in claim 8; the screen being formed of high strength, high rigidity wire having a diameter of the order of .040 to .050 inch and being of the order of 10 mesh.

10. Means for modulating the flow of air to the inlet throat of a jet engine having a fixed inlet lip to intercept debris which otherwise would enter the engine compressor and to prevent compressor stall and flameout at standstill and low forward roll speeds, comprising: a unitary debris guard formed of wire mesh screen and disposed forward of the plane of the inlet lip to peripherally intercept airflow from outside the margin of the inlet lip and divide it into a multiplicity of small airstreams with fine turbulence and high velocity and energy to energize the boundary layer on the inner surface of the inlet throat and improve the airflow along the inner surface to the compressor while also intercepting any debris picked up from the gorund.

11. Means operative at high jet engine speeds for modulating the flow of excess air toward and beyond the margin of the inlet throat of a jet engine having a fixed inlet lip, comprising: a unitary debris guard disposed forward of the plane of the inlet lip to peripherally intercept the diverted portion of the excess airflow adjacent to the stream tube flowing into the inlet throat and divide it into a multiplicity of small airstreams with fine turbulence and high velocity and energy to energize the boundary layer on the outer surface of the inlet throat and delay the drag rise of the inlet lip.

References Cited

UNITED STATES PATENTS

| | | | |
|---|---|---|---|
| 3,008,291 | 11/1961 | Hardgrave | 138—44 |
| 3,224,712 | 12/1965 | Taylor | 244—53 B |

ALAN COHAN, Primary Examiner